United States Patent
Simske et al.

(10) Patent No.: US 7,539,343 B2
(45) Date of Patent: May 26, 2009

(54) CLASSIFYING REGIONS DEFINED WITHIN A DIGITAL IMAGE

(75) Inventors: Steven J. Simske, Fort Collins, CO (US); Roland Burns, Sant Cugat des Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 787 days.

(21) Appl. No.: 11/226,661

(22) Filed: Sep. 14, 2005

(65) Prior Publication Data
US 2007/0047813 A1 Mar. 1, 2007

Related U.S. Application Data

(60) Provisional application No. 60/711,297, filed on Aug. 24, 2005.

(51) Int. Cl.
*G06K 9/34* (2006.01)
(52) U.S. Cl. ........................ 382/176; 382/224
(58) Field of Classification Search ................ 382/176, 382/172, 194, 199, 302, 274, 224; 715/221, 715/211; 716/13, 14; 438/128, 381.1; 703/2; 375/240
See application file for complete search history.

(56) References Cited

U.S. PATENT DOCUMENTS

| 5,280,547 | A | * | 1/1994 | Mahoney | 382/302 |
|---|---|---|---|---|---|
| 5,596,655 | A | | 1/1997 | Lopez | |
| 6,151,426 | A | | 11/2000 | Lee et al. | |
| 6,263,122 | B1 | | 7/2001 | Simske et al. | |
| 7,412,682 | B2 | * | 8/2008 | Malhotra et al. | 716/13 |
| 7,430,711 | B2 | * | 9/2008 | Rivers-Moore et al. | 715/221 |
| 2004/0015775 | A1 | | 1/2004 | Simske et al. | |
| 2004/0017941 | A1 | | 1/2004 | Simske | |
| 2004/0037470 | A1 | | 2/2004 | Simske | |
| 2004/0133560 | A1 | | 7/2004 | Simske | |

FOREIGN PATENT DOCUMENTS

| EP | 0992934 | 4/2000 |
|---|---|---|
| WO | WO 0113279 | 2/2001 |

OTHER PUBLICATIONS

International Search Report for PCT/US2006/028946, mailed Jan. 8, 2007, 4 pages.
Yuan, Y. et al, "Automatic document processing: A survey", Pattern Recognition, Elsevier, Kidlington, GB, vol. 29, No. 12, Dec. 1996, pp. 1931-1952.

* cited by examiner

*Primary Examiner*—Anh Hong Do

(57) ABSTRACT

A method for classifying regions defined within a digital image includes defining a tessellated set of regions from a plurality of regions identified by a plurality of segmented versions of the digital image and then classifying each tessellated region according to a likelihood that the tessellated region contains text.

30 Claims, 11 Drawing Sheets

CLASSIFYING REGIONS DEFINED WITHIN A DIGITAL IMAGE

CROSS REFERENCE TO RELATED APPLICATIONS

This application is related to co-pending provisional application Ser. No. 60/711,297 filed Aug. 24, 2005.

BACKGROUND

It is common for individuals and businesses to archive physical, paper documents in digital form. For example, a multi-page paper document can be scanned and saved electronically in a digital format such as Adobe's PDF (Portable Document Format). Digital document models consider different aspects of an electronic document. For example, a three-aspect model may include the text, a raster image of each page, and the document structure. Simpler two-aspect models may include the text and a raster image of each page. The common denominator is the text. Text is used for indexing, summarization, document clustering, archiving, linking, and task-flow/work-flow assignment.

Consequently, methods and systems for recognizing and extracting text from digital images of physical documents are often rated according to their accuracy and utility. An individual scanning a document wants to be confident that all text has been recognized and extracted and wants that text to be arranged in a meaningful manner.

DRAWINGS

Figure 12:
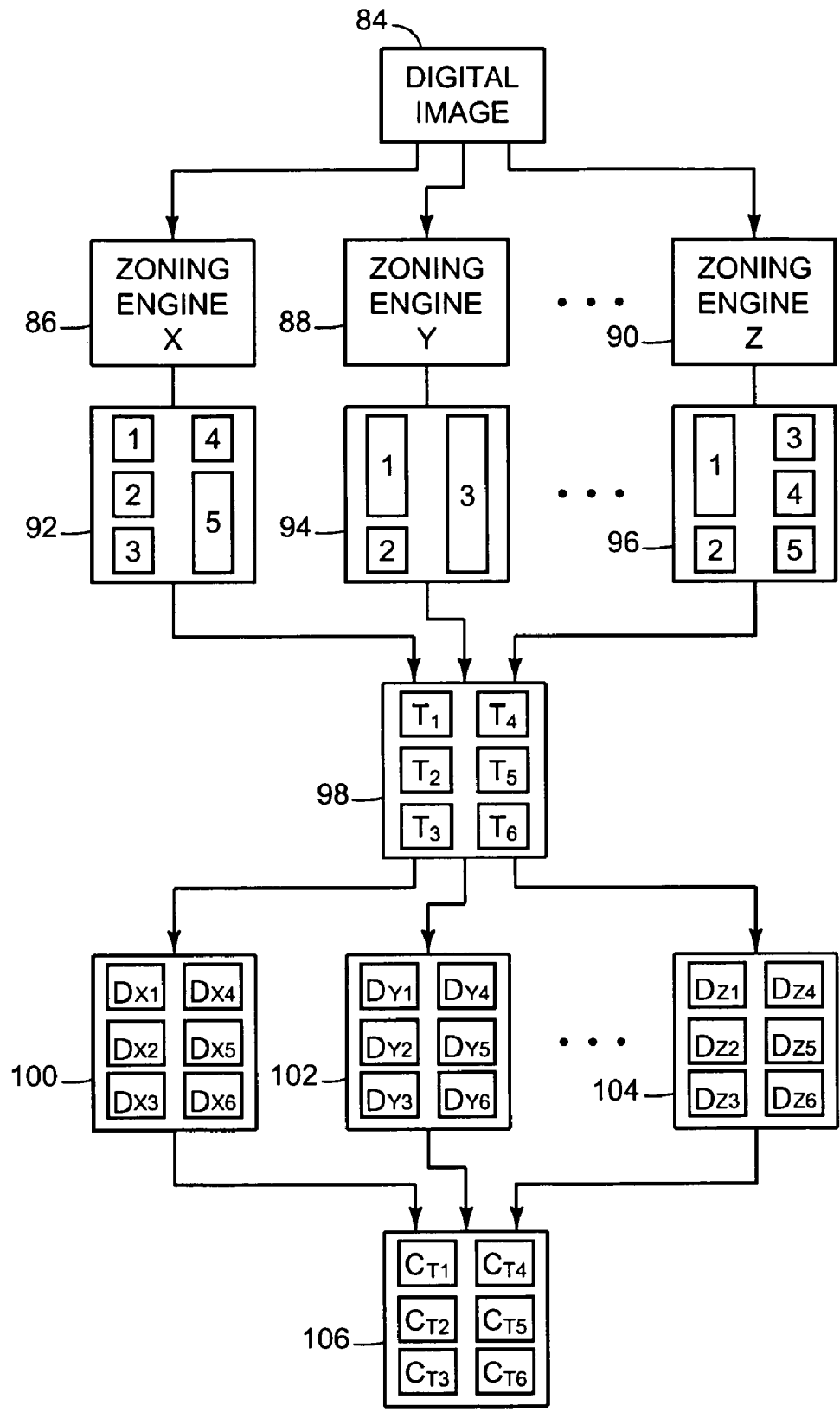
Figure 13:
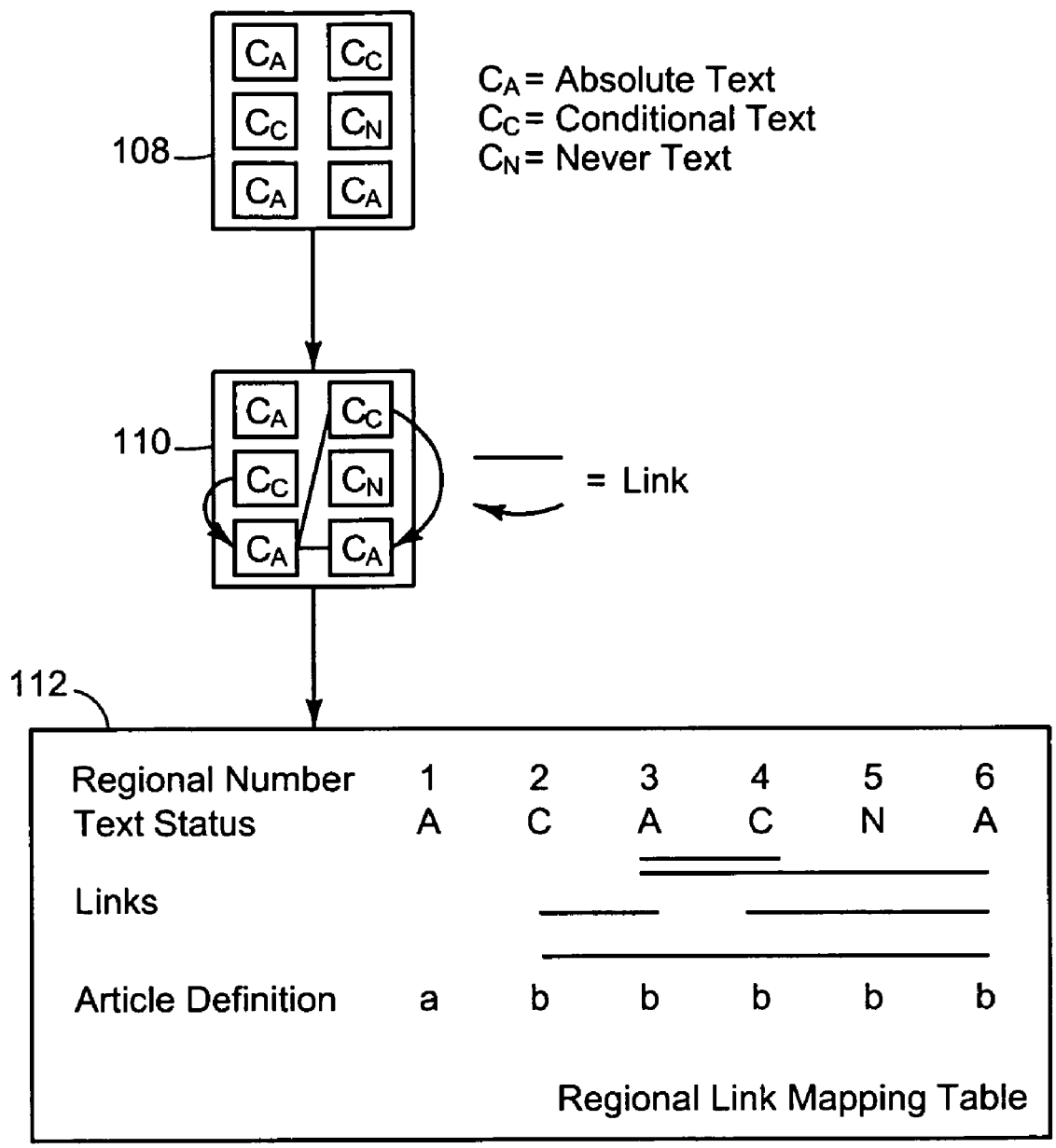

FIGS. 12 and 13 graphically illustrate implementations of various embodiments.

DETAILED DESCRIPTION

INTRODUCTION: Various embodiments described below operate in an automated fashion to classify regions within a digital image linking those regions containing related text. A digital image, for example, may be obtained by scanning or digitizing a document page. Initially, that page is a raster image and while that image when printed may include text discernable by a viewer, the text is not yet discernable in electronic form. In other words, the computer file representing the raster image does not identify the text. It simply identifies a grid of pixels that when printed or displayed reveal the text. By comparison, a file generated using a word processor specifically identifies the text and the placement of that text on a page.

Various embodiments operate on a digital image to identify and then classify tessellated regions within a digital image according to a likelihood that each particular region contains text. A description and examples related to tessellation of regions are provided below. For example, in a given implementation some tessellated regions may be classified as "always text" reflecting a high likelihood that those regions contain text. Other tessellated regions may be classified as "conditional text" reflecting a good or possible likelihood that those regions contain text. A third group of tessellated regions may be classified as "never text" reflecting a low likelihood that the regions contain text.

Text is extracted or otherwise obtained for those tessellated regions classified as containing text. In the example above, tessellated regions classified as always text and conditional text are classified as containing text. Related tessellated regions share a common word or phrase and are then linked. The linked tessellated regions can then be grouped into articles. The term article simply refers to a group of linked regions. A logical text flow between linked tessellated regions can then be defined within each article.

The following description is broken into sections. The first section, labeled "introductory examples" describes how a digital image may be segmented into regions and how regions containing text are linked to define articles and a flow between regions within an article. The second section labeled "environment" describes an exemplary computing environment in which embodiments may be implemented. The third section, labeled "components," describes exemplary logical and physical components used to implement various embodiments. The fourth section, labeled "operation," describes exemplary method steps for implementing various embodiments The fifth section labeled "implementation examples" describe exemplary implementations.

Figure 1:
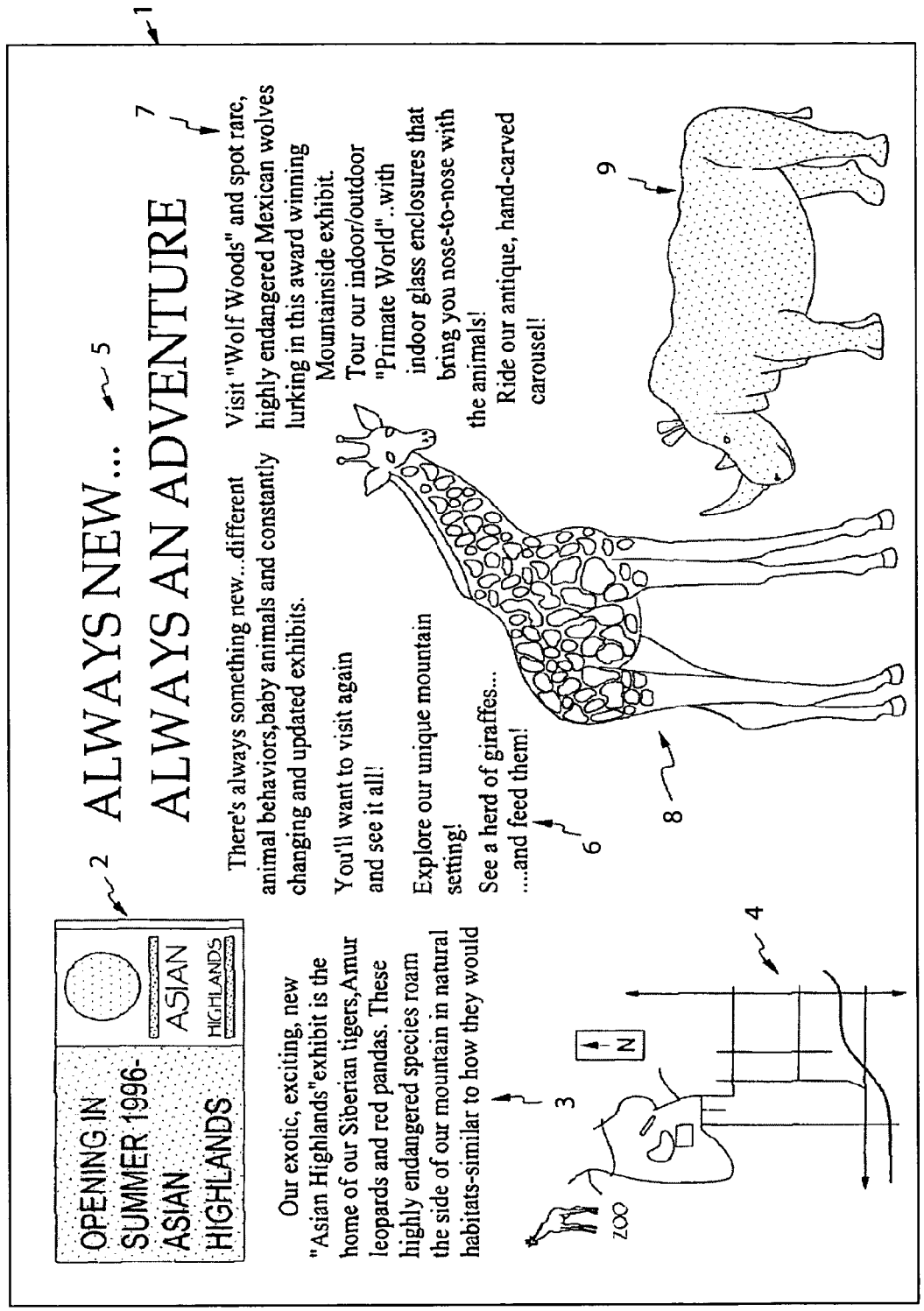
FIGS. 1-3 illustrate and example of how a digital image may be segmented into a set of regions according to an embodiment.

INTRODUCTORY EXAMPLES: FIG. 1 illustrates an exemplary digital image 1. Digital image 1 includes a title 2, a text section 3, a vector drawing 4, a header 5, text sections 6 and 7, and photo images 8 and 9. Using one or more zoning engines, digital image 1 can be segmented into regions. As will be discussed below, a zoning engine is a program configured to examine a digital image to identify patterns and to then define regions based on those patterns. Certain patterns are reflective of text; others are reflective of vector drawings, or photo images. One zoning engine may be designed or otherwise tuned with parameters search for patterns reflective of text. Another may be configured or tuned to search for patterns reflective of vector drawings or photo images. A number of zoning engines create a set of segmented versions of a digital image. Each segmented version defines a set of regions that can be different that the set of regions defined by another segmented version.

Described in more detail below, a tessellated set of regions can be defined through a comparison of the segmented versions. Where two segmented versions of a digital image define differing regions, then tessellation of the versions will result in a tessellated set that will define more regions than either of the segmented versions.

Figure 2:
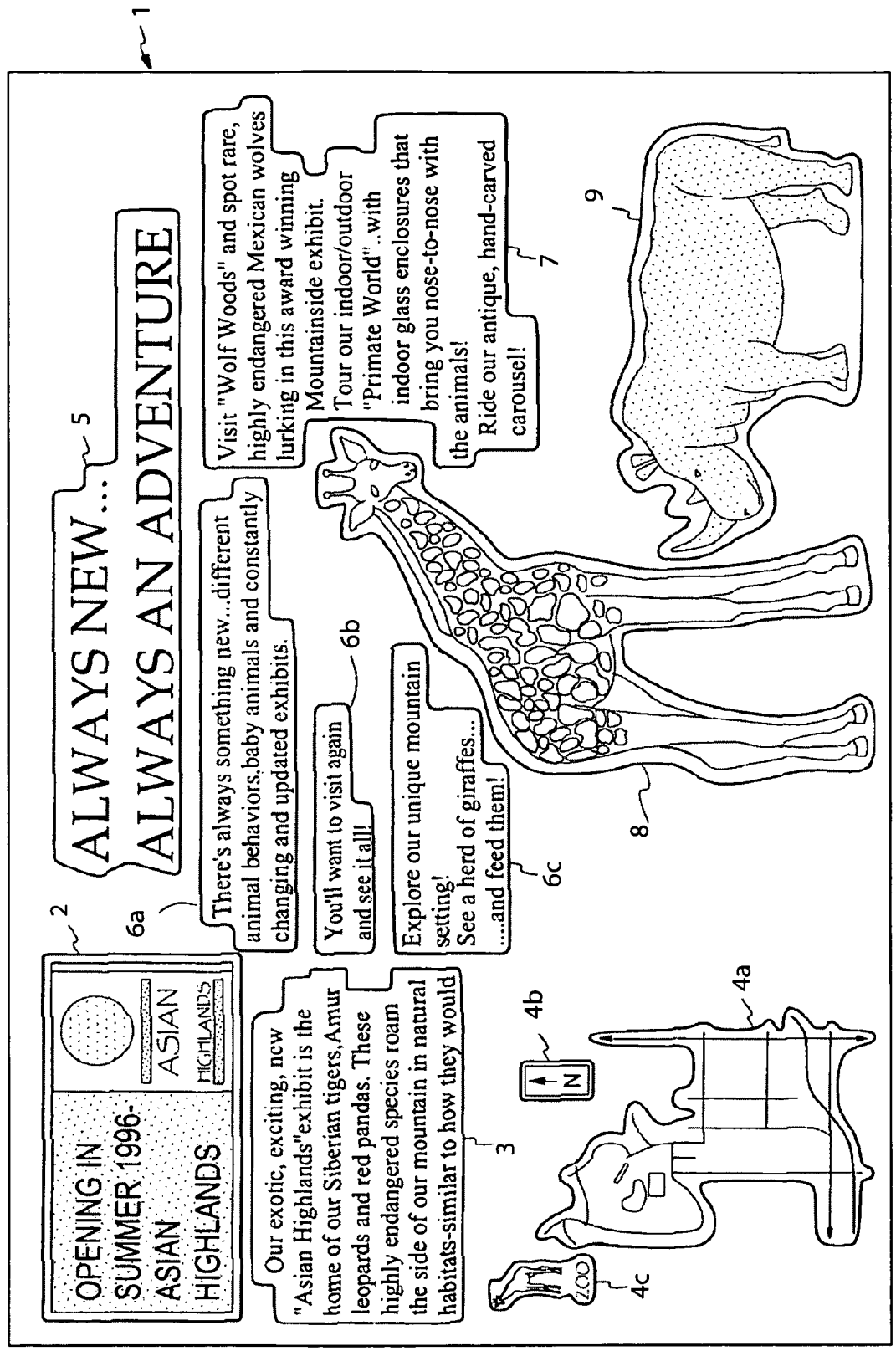

Moving to FIG. 2, a particular zoning engine has segmented digital image 1 into a first set of regions. Title 2 is a bounded region. Text section 3 is a bounded region. Vector drawing 4 is segmented into three regions 4a, 4b, and 4c. Title 5 is a bounded region, while text section 6 is segmented into three regions 6a, 6b, and 6c. Each of text section 7 and photo images 8 and 9 are bounded regions. Moving to FIG. 3, another zoning engine has segmented digital image 1 into a second set of regions. Here, title 2 is a bounded region and Text section 3 is a bounded region. Vector drawing 4 is a single bounded region as is header 5. Text sections 6 and 7 along with photo images 8 and 9 are a single bounded region.

Figure 3:
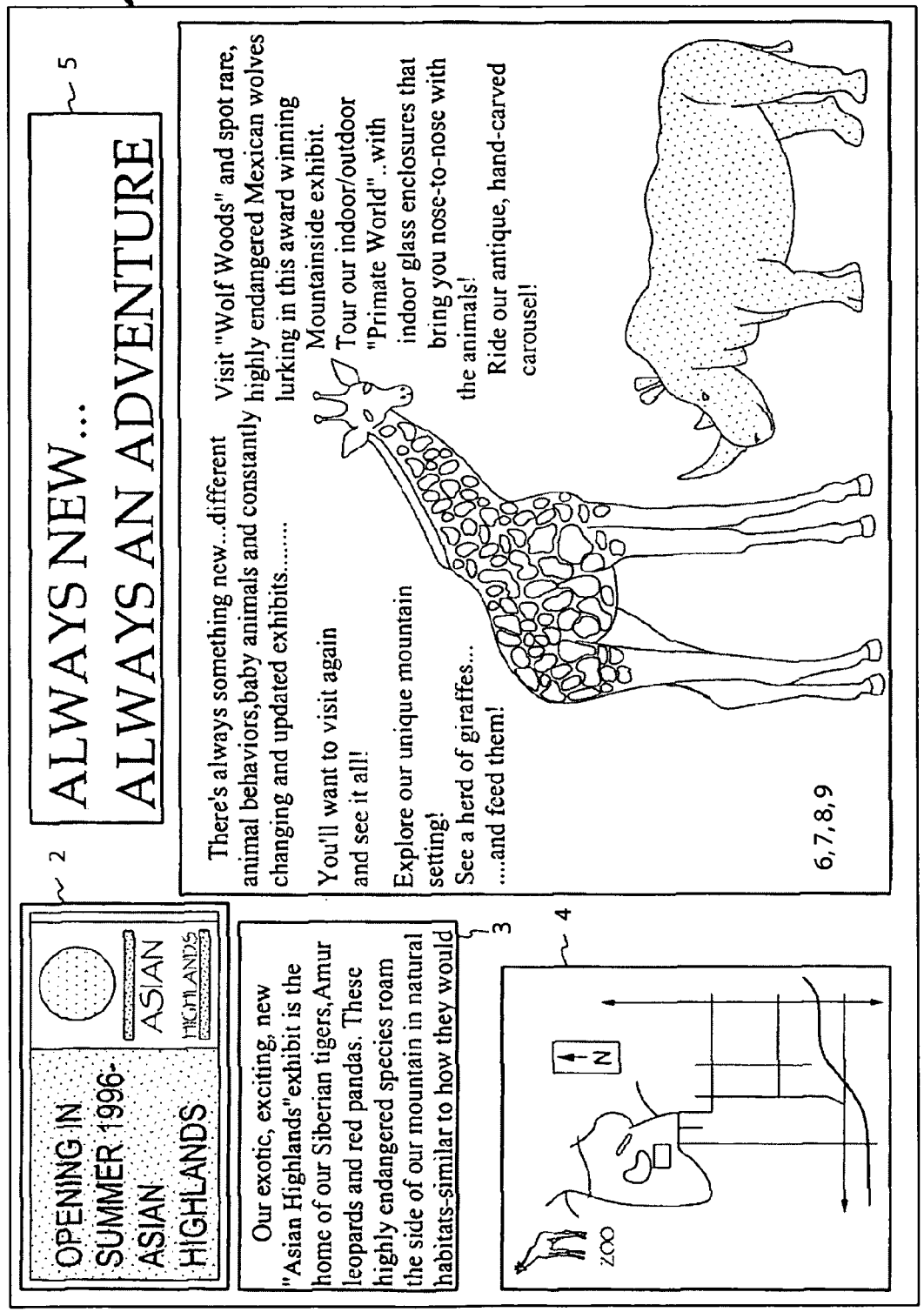

Clearly, the set of regions defined in FIG. 2 is different than the set of regions defined in FIG. 3. Through a comparison of the two region sets, a tessellated set of regions can be defined. Any sections of any regions that differ in shape between two or more zoning engines become smaller, individual regions, providing full tessellation. The components section below provides an example of a tessellation engine configured to define a tessellated set of regions for a digital image. It is also noted that any number of zoning engines may be used to create a corresponding number of segmented versions of a digital image.

Figure 4:
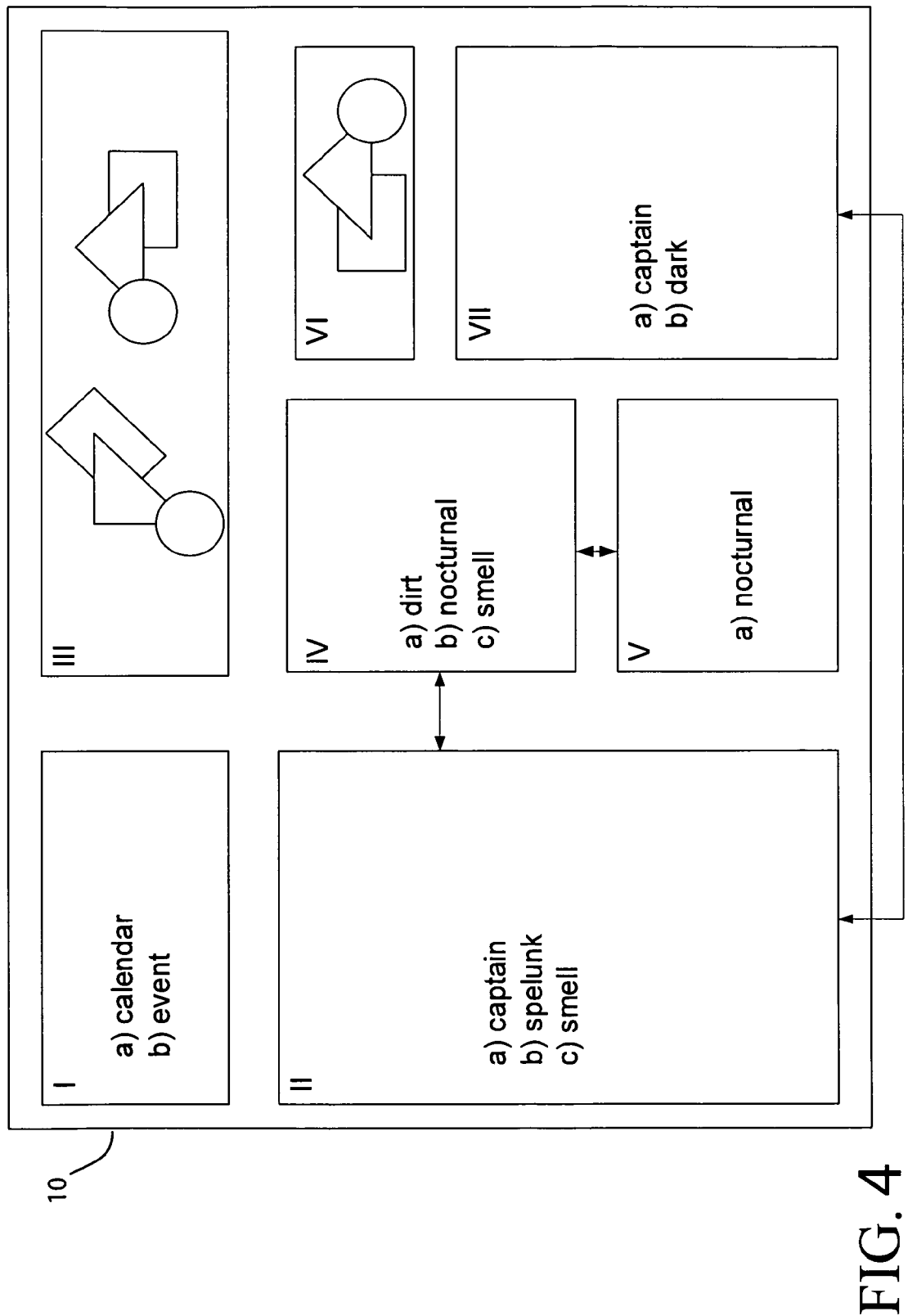
FIG. 4 illustrates an example of how regions may be linked to define an article.

FIG. 4 illustrates a digital image 10 (unrelated to FIGS. 1-3) having a tessellated set of regions I, II, III, IV, V, VI, and VII. There is a natural column-wise flow between the regions. That flow goes down the left most column and across the page. Regions I, II, IV, V and VII have been classified as containing text. Regions III and VI include graphics and are classified as not containing text. As a consequence, text is extracted from each of regions I, II, IV, V, and VII through a text recognition process.

An examination of regions I, I, II, IV, V, and VII reveals the most "important" words in each of those regions. A word can be determined to be important when its relative occurrence within a tessellated region exceeds its relative occurrence in a larger corpus as described below. In the example of FIG. 4, each tessellated region classified as containing text is shown with a weighted set of words identified as important for that region.

Regions classified as containing text are linked when they share a weighted word or phrase. Linked regions can be grouped to form an article. In FIG. 4, region I does not share a weighted word with any other region and thus is an article in and of itself. Region II shares a weighted word with region IV and another weighted word with region VII. Region IV shares a weighted word with region V. As such, Regions II, IV, V, and VII are directly or indirectly linked to one another and are grouped to form a second article separate from that of region I. As noted above, there is a natural column-wise flow between regions. With the second article, that flow could be defined as region II to region IV to region V to region VII.

Figure 5:
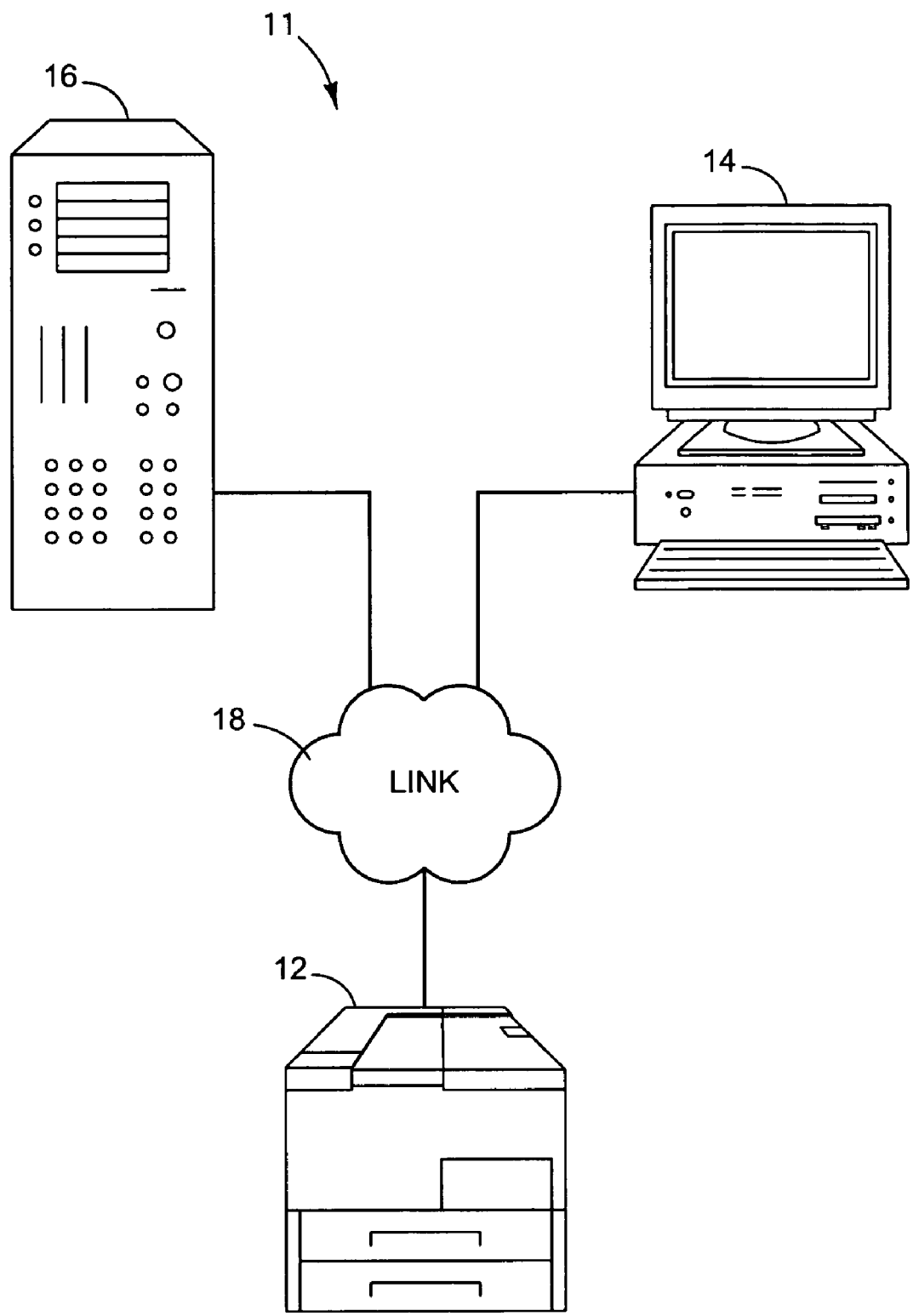
FIG. 5 is a schematic view of a network environment in which various embodiments may be implemented

ENVIRONMENT: Although the various embodiments of the invention disclosed herein will be described with reference to the network environment 11 shown in FIG. 5, the invention is not limited to use with environment 11. The invention may be implemented in any environment in which text is to be extracted from a digital image. Referring to FIG. 5, environment 11 includes imaging device 12, computer 14, and server 16. Imaging device 12 represents generally any device such as a multi-function printer that is capable of generating a digital image of a page. Imaging device 12 may (but need not) be capable of printing the digital image. Computer 14 represents generally any general purpose computer. Server 16 represents generally any computing device capable of functioning as an archive for digital documents.

Link 18 interconnects imaging device 12 with computer 14 and server 16. Link 18 represents generally one or more of a cable, wireless, fiber optic, or remote connection via a telecommunication link, an infrared link, a radio frequency link, or any other connector or system that provides electronic communication between devices 12, 14 and 16. Link 18 may represent an intranet, the Internet, or a combination of both. The paths followed by link 18, between devices 12, 14, and 16 in the schematic view of FIG. 5, represent the logical communication paths between these devices, not necessarily the physical paths between the devices. Devices 12, 14, and 16 can be connected to network environment 11 at any point and the appropriate communication path established logically between the devices.

Figure 6:
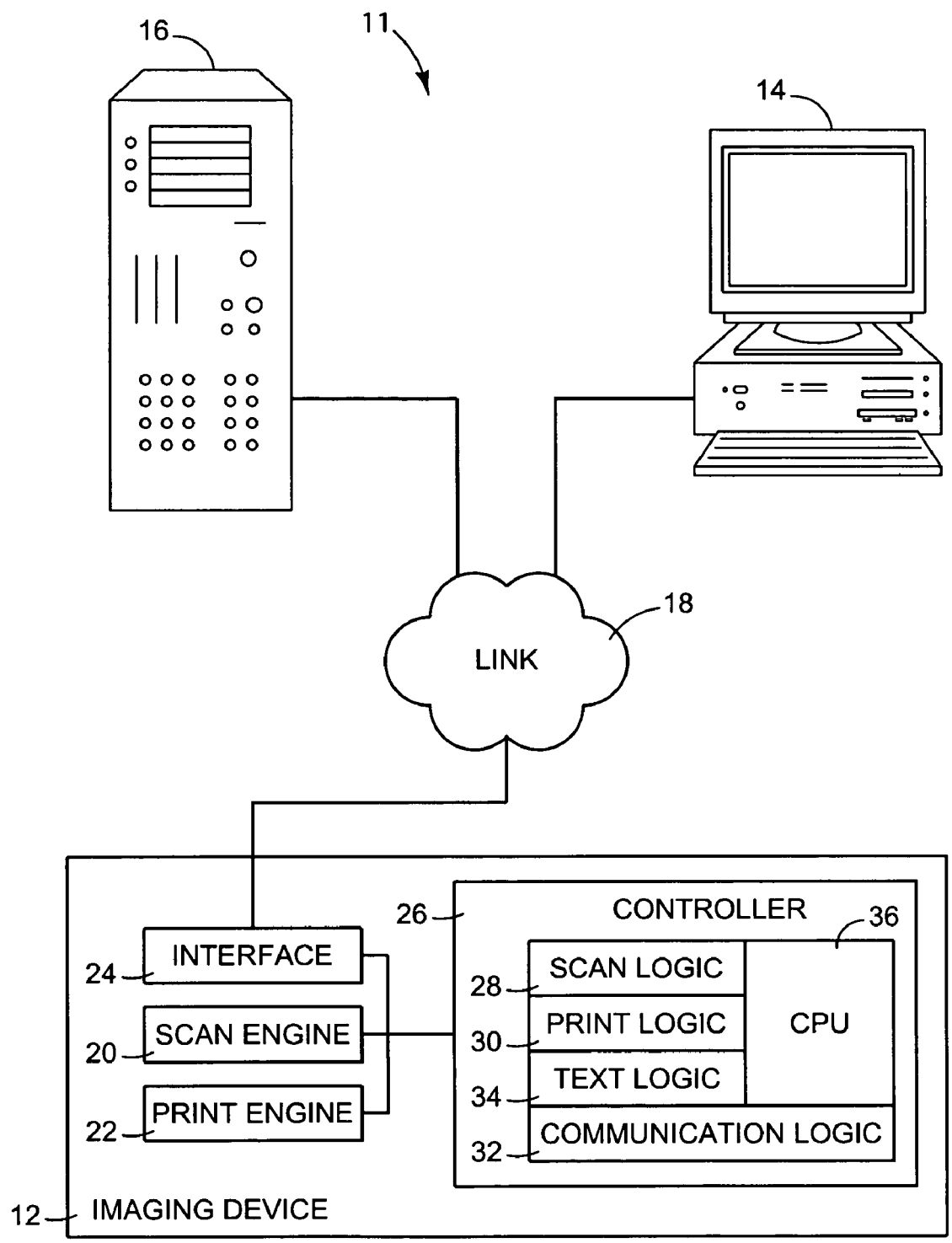
FIG. 6 is an exemplary block diagram illustrating logical and physical components operating on an imaging device according to an embodiment.

COMPONENTS: The logical components of various embodiments of will now be described with reference to the exemplary block diagram of FIG. 6. In this example, imaging device 12 is shown to include scan engine 20, print engine 22, interface 24, and controller 26. Scan engine 20 represents generally any combination of hardware capable of being utilized to generate a digital image or digital representation of a physical object such as a document page. Print engine 22 represents generally any combination of hardware capable of forming a desired image on paper or other media. For example, where imaging device 12 is a laser printer, print engine 22 includes all the electro-photographic and paper handling components required to, retrieve a sheet from an input tray, fix toner or ink to the sheet in the form of a desired image, and pass the sheet to an output bin. Interface 24 represents generally any combination of hardware capable of being utilized to establish electronic communication with computer 14 and/or server 16 via link 18. As an example, interface 24 may be an Ethernet, parallel, USB, or SCSI port, or even a wireless access point or infra red port.

Controller 26 represents generally a combination of hardware and programming capable of controlling or otherwise utilizing scan engine 20, print engine 22, and interface 24. In the example shown controller 26, includes scan logic 28, print logic 30, communication logic 32, text logic 34, and CPU 36. Scan logic 28 represents generally a computer readable medium containing any combination of program instructions for guiding the operation of scan engine 20. Scan logic 28 is responsible for utilizing scan engine 20 to obtain a digital image of a physical object. For example, a user of imaging device 12 may place a page on a platen supplied by scan engine 20 and then press a control button informing imaging device 12 to begin a scan of that page. Scan logic 28, in response, directs scan engine 20 to scan the page and assembles information obtained from the scan to form a digital image of the page.

Print logic 30 represents generally a computer readable medium containing any combination of program instructions for guiding the operation of print engine 22 to form a desired image on a sheet of paper or other medium. In a copy operation, for example, print logic 30 may obtain a digital image assembled by scan logic 28 and cause print engine 22 to form a physical representation of that digital image on a sheet of paper or other medium. In a print operation, print logic 30 may utilize a print job obtained from computer 14 to guide print engine 22. That print job may define one or more pages of a document to be printed.

Communication logic 32 represents generally a computer readable medium containing any combination of program instructions for utilizing interface 24 to communicate and exchange data with computer 14 and server 16. For example, communication logic 32 is responsible for receiving print jobs from computer 14. Communication logic 32 is also responsible for sending electronic documents assembled by text logic 34 (discussed below) to be archived or otherwise stored by server 16.

Figure 8:
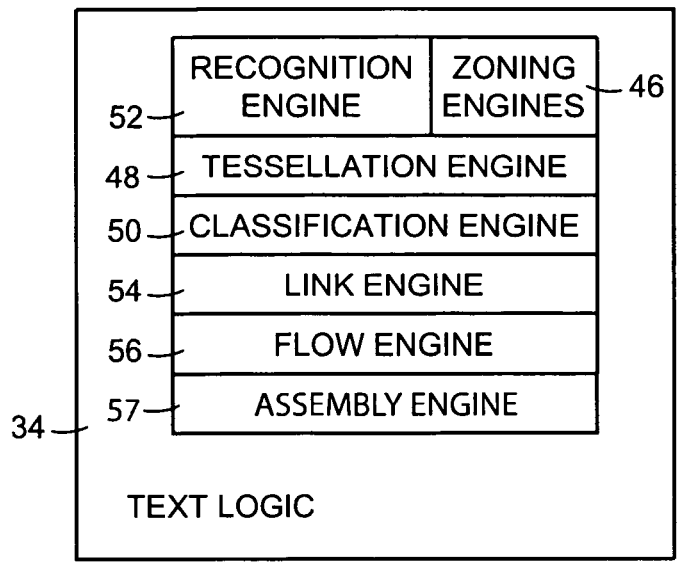
FIG. 8 is an exemplary block diagram illustrating logical components of text logic that may be used to implement various embodiments.

Text logic 34, an example of which is described in more detail with respect to FIG. 8, represents a computer readable medium containing any combination of program instructions for identifying and classifying tessellated regions within a digital image according to a likelihood that each particular tessellated region contains text. That digital image, for example, may be obtained from scan logic 28. Text logic 34 is responsible for recognizing and extracting or otherwise obtaining text for those tessellated regions classified as containing text and then linking related tessellated regions that share a common weighted word or phrase. Text logic 34 groups the linked tessellated regions into articles with each article containing a linked group of tessellated regions defining a text flow from tessellated region to tessellated region within that article.

Text logic 34 is configured to perform these functions for each of a group of digital images representing a scanned document linking tessellated regions within a given digital image as well as between digital images. For example, a given article made of a group of linked tessellated regions may span two or more digital images.

Text logic 34 is also responsible for assembling a digital document from a group of digital images. The digital document, for example, can include a page corresponding to each digital image. Each page of the digital document includes its corresponding digital image. The digital document also includes the text obtained from each tessellated region classified as containing text. The digital document defines a text flow, and a page layout that describes the placement of the text for each page of the digital document. The text flow describes a flow of the text between linked tessellated regions.

CPU 36 represents generally any processor capable of executing the program's instructions of scan logic 28, print logic 30, communication logic, and text logic 34.

Figure 7:
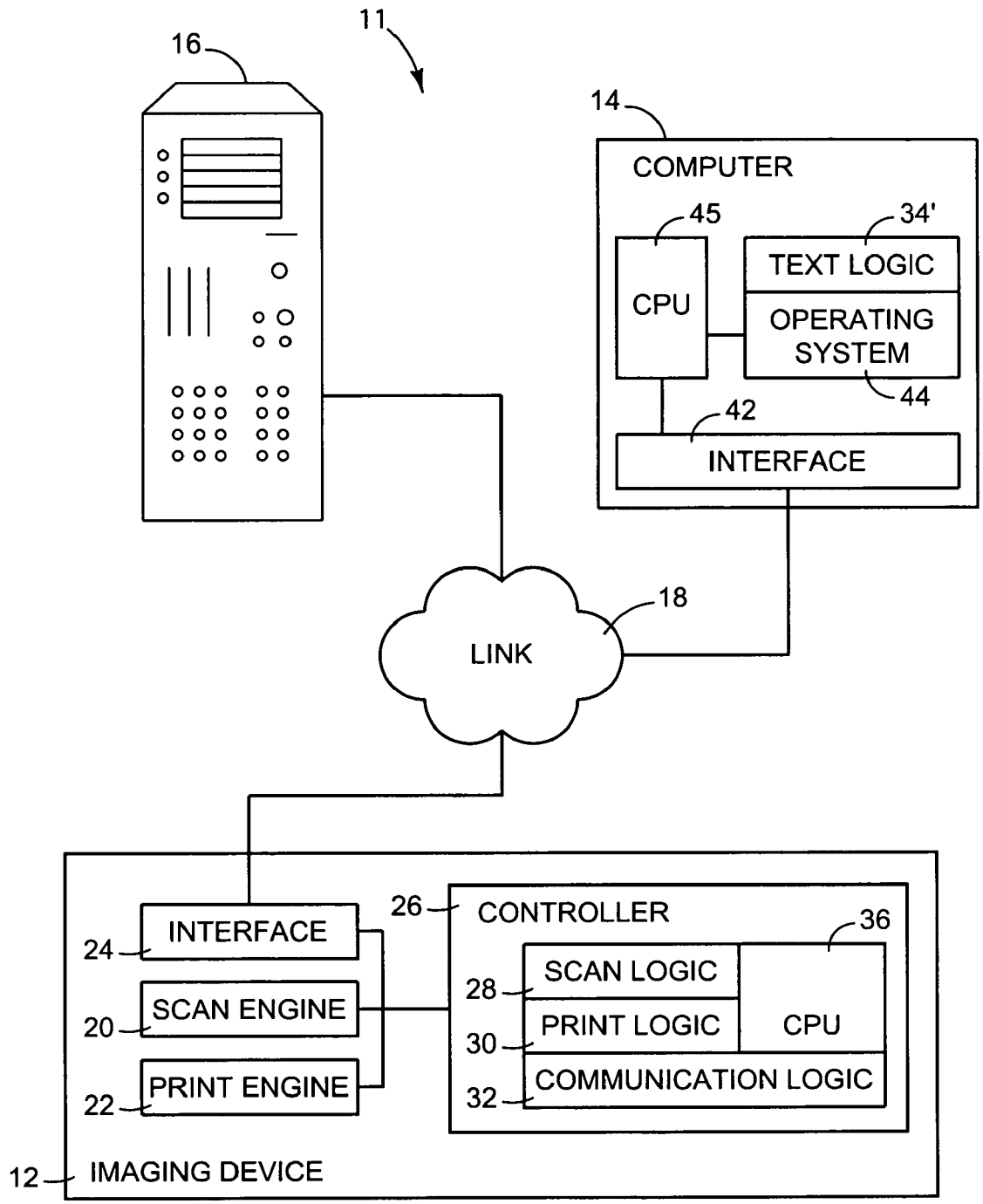
FIG. 7 is an exemplary block diagram illustrating logical and physical components operating on an imaging device and a computer according to another embodiment.

Moving on to the example of FIG. 7, text logic 34' is shown to be provided by computer 14 instead of imaging device 12. Computer 14 is shown to also include interface 42, operating system 44 and CPU 45. Operating system 44 represents generally any operating system on top of which the program instructions for text logic 34' can operate. CPU 45 is responsible for executing the program instructions of text logic 34' and operating system 44 while interface 42 represents generally any combination of hardware that can be utilized to establish electronic communication with imaging device 12 and/or server 16 via link 18. As an example, interface 42 may be an Ethernet, parallel, USB, or SCSI port, or even a wireless access point or infrared port.

In this example text logic 34' may be a stand alone program or it may be a component of or otherwise associated with a device driver for imaging device 12 and provided by operating system 44. In either case, text logic 34', in this example, performs the same tasks as described above with respect to FIG. 6. In addition, text logic 34' may operate on digital images obtained locally on computer 14 or from server 16. For example, server 16 and/or computer 14 may include a group of electronic files each containing a group of digital images representing a scanned document. Without regard to imaging device 12, text logic 34' may be used to convert each of these electronic files to generate a digital document that includes a page corresponding to each digital image, the text obtained from the tessellated regions classified as containing text for each of those digital images, a page layout defining the placement of the text on each page of the digital document and a text flow. Again, the text flow describes a flow of the text between tessellated regions and can span two or more pages of the digital document.

FIG. 8 is a block diagram illustrating an exemplary group of logical elements included in text logic 34. As shown, text logic 34 includes zoning engines 46, tessellation engine 48, classification engine 50, recognition engine 52, link engine 54, flow engine 56, and assembly engine 57. Zoning engines 46 represent program instructions for generating a plurality of segmented versions of a digital image where each segmented version identifies a plurality of regions of the digital image. An example is discussed below with reference to FIG. 12. Two or more of the plurality of zoning engines 46 may each be an instance of a common zoning engine using different parameters than any other instance of that common zoning engine. In other words, a single common zoning engine may be executed two or more times each time with different parameters. While a single zoning engine 46 is in use, each instance of that common zoning engine is referred to as a zoning engine 46 separate from any other instance 46 of that common zoning engine.

Each zoning engine 46 identifies regions within a digital image based on examined characteristics of the digital image. Each portion of the digital image sharing common characteristics, as determined by a particular zoning engine 46, is identified as a region by that zoning engine 46. For example, a given zoning engine 46, examining the pixels of a digital image, identifies patterns. Certain patterns are characteristic of text. Others are characteristic of vector drawings, and yet others are characteristic of photo images. That zoning engine 46 may identify or define regions within the digital image according to those patterns.

For each region identified by a zoning engine 46, that zoning engine 46 is also responsible for providing a normalized probability data set containing a probability value for each of a plurality of content types. As alluded to above, content types include, for example, text, drawings, and photos. A normalized probability data set includes a probability value assigned to each content type. The sum of the probability values in each set equals the sum of the values for each other probability data set for each of the other regions identified by each of the zoning engines 46. For example, a probability data set may be normalized to the value of one, so that the sum of the probability values in that set and all other sets equals one.

Each probability value in a given probability data set corresponds to a probability that a particular region contains a given content type. A zoning engine 46 may, for example, determine a probability value for each content type based one or more characteristics of a corresponding region identified by that zoning engine 46. Certain characteristics are indicative of text. Other characteristics are indicative of vector drawings and others are indicative of photo images. For more information regarding a normalized probability data set refer to U.S. Pub. No. 2004/0017941 which is incorporated by reference.

The following provides an example of a normalized probability data set.

| Content Type | Probability Value |
| --- | --- |
| Text | (x) |
| Drawing | (y) |
| Photo | (z) |

Where the above data set is normalized to one, the sum of x, y, and z equals one. The value of each of x, y, and z corresponds to a probability that a region associated with the data set contains a given content type. Where x equals one, the probability that the region contains text is one hundred percent. Where x equals zero point five, that probability is fifty percent. The largest of the probability values x, y, and z indicates the most likely content type for a given region as determined by a particular zoning engine 46. It is noted that while only three content types are shown in the above table, other content types could be included. For example, other content types could include tables and multi-bit drawings. The analysis remains the same, however. The sum of the probability values for each of the content types is normalized to one or some other constant.

Tessellation engine 48 represents program instructions for further subdividing or tessellating the regions identified by the zoning engines 46. Any sections of any regions that differ in shape between two or more zoning engines 46 are subdivided to become smaller, individual regions, providing full tessellation.

Portions of regions—defined by all zoning engines 46—that bound the same set of pixels are each defined as a separate tessellated region. Portions of regions—defined by less than all but more than one of zoning engines 46—that bound the same set of pixels are each defined as separate tessellated regions. Portions of regions—defined by a single zoning engine 46—that bound pixels not bound by regions defined by other zoning engines 46 are each defined as separate tessellated regions. In other words, regions (defined by different zoning engines 46) are subdivided based on how they overlap one another. Areas of overlap and non-overlap are differentiated and defined as separate tessellated regions. The following provides an example. Suppose a four by eight pixel digital image, represented by the following pixel map, has the following region (marked with one's) identified by one zoning engine 46.

```
0 0 0 0 0 0 0 0
0 1 1 1 1 0 0 0
0 1 1 1 1 0 0 0
0 0 0 0 0 0 0 0
```

Suppose a second zoning engine 46 identified the following region (marked with two's).

```
0 0 0 2 2 2 2 0
0 0 0 2 2 2 2 0
0 0 0 2 2 0 0 0
0 0 0 0 0 0 0 0
```

Adding the two maps together gives the tessellated regions, one more than the two

```
0 0 0 2 2 2 2 0
0 1 1 3 3 2 2 0
0 1 1 3 3 0 0 0
0 0 0 0 0 0 0 0
```

Note that there are three tessellated regions, one more than the two regions identified by the two zoning engines 46. Each of the tessellated regions is marked with an (a), (b), or a (c) in the following pixel map.

```
0 0 0 b b b b 0
0 a a c c b b 0
0 a a c c 0 0 0
0 0 0 0 0 0 0 0
```

The process is the same for any number of additional zoning engines 46. it is noted that in operation, embodiment operate on page sized digital images were tessellated regions are large enough to contain text, vector drawings, and/or photo images. Plainly, a four by eight pixel image would not suffice in practice but it does suffice in efficiently providing an example of tessellation.

Classification engine 50 represents program instructions for classifying tessellated regions based, at least indirectly, on a likelihood that a given tessellated region contains text. In performing its tasks, classification engine 50 obtains a normalized probability data set for each non-tessellated region identified in each segmented version of the digital image for each zoning engine 46. As described above, each probability data set contains a probability value for each of a plurality of content types. Classification engine 50 then maps each probability data set to one or more corresponding tessellated regions identified by tessellation engine 48. For each probability data set mapped to a particular tessellated region, classification engine 50 sums the probability values for each content type and then predicts a content type for each tessellated region based at least in part upon a maximum of the summed probability values for that tessellated region. Classification engine 50 may weight each maximum summed value according to a confidence factor for each zoning engine 46. Finally, classification engine 50 classifies each tessellated region at least partially according to its predicted content type.

The following provides a more detailed mathematical model for classification engine. Classification engine 50 back-projects each tessellated region to the original non-tessellated region from which it arose for each zoning engine 46. A one to one back-projection is guaranteed due to the tessellation procedure followed by tessellation engine 48. The back-projection for region (n) in the tessellated set of regions is region (m), where, reading order is maintained m<=n. This back-projection n→m is defined as $\phi_n$, that is the back-projection $\phi$ of region n:

$$\phi_n = \text{back-projection}[n \to m] \quad \text{Equation 1}$$

Now, letting the set of all region classifications be R, where for example R(1)=text, R(2)=drawing, R(3)=photo, etc., then for each zoning engine 46 there is a statistical probability for each classification for each non-tessellated region, defined by:

$$\Sigma_i [p(R(i))] = 1.0 \quad \text{Equation 2}$$

that is, the sum of these probabilities is 1.0 (normalized). The distribution of probabilities for the tessellated regions can be obtained as follows:

$$[P(R)_s]_i = \Sigma_n (\phi_n)_s \Sigma_i [p(R(i))]_s \quad \text{Equation 3}$$

Where $P(R)_s$ is the overall summed probabilities for the set of region classifications R for the zoning engine (s), and as such is a vector, not a scalar—thus, each individual $[P(R)_s]_i$ is a scalar, as in Equation 3. $\Sigma_n (\phi_n)_s$ is the back-projecting of each tessellated region to its original counterpart as output by the zoning engine (s). Finally, $\Sigma_i [p(R(i))]_s$ is the actual probability distribution for all of the region classification types in the system. Next, classification engine 50 forms the classification $C(R)_n$ for the $n^{th}$ tessellated region based on selecting the maximum overall summed probability:

$$C(R)_n = \max_i(\Sigma_s \Sigma_n (\phi_n)_s [p(R(i))]_s)\qquad\text{Equation 4}$$

Where (s) is the index for the distinct zoning engines, (n) is the index for the back-projection along with the index for the tessellated region, and $[p(R(i))]_s$ is the probability of this engine's back-projection for region classification (i). Finally, with relative weighting factors for each of zoning engines 46 (that is, the "confidence" factor for the probability data sets for each zoning engine 46), the value for $C(R)_n$ can be adjusted as follows:

$$C(R)_n = \max_i(\Sigma_s \Sigma_n (\phi_n)_s [\Lambda(i,s) p(R(i))]_s)\qquad\text{Equation 5}$$

where $\Lambda(i,s)$ is now the weighting factor for the $i^{th}$ class of region types, for zoning engine (s) and $[\Lambda(i,s)p(R(i))]_s$ is a weighted probability value.

Next classification engine 50 can calculate a differential text classification (DTC) for each tessellated region. This is the differential probability that a region contains text:

$$DTC[C(R)_n] = C(\text{Text})_n - C(R)_n\qquad\text{Equation 6}$$

Note that in Equation 6, $C(R)_n$ is the max summed probability for any classification other than text if DTC>0—otherwise, DTC is <=0] If DTC>=0 within a predetermined threshold added to $C(\text{Text})_n$, then the tessellated region is classified as "Always text." If DTC<0 within a particular threshold, then the tessellated region may be classified as "Conditional Text". Otherwise, the tessellated region is classified as "Never Text." The specific labels, Always Text, Conditional Text, and Never Text are not important. The labels are selected merely because they relate a relative likelihood or probability that a given tessellated region will contain text.

Recognition engine 52 represents program instructions for selectively extracting or otherwise recognizing text from tessellated regions of a digital image that have been classified as containing text. In the above example, this includes tessellated regions classified as always text and conditional text. Recognition engine 52 may perform its tasks at any time. For example, recognition engine 52 may extract all text, without regard to tessellated region, from a digital image. Later, after tessellated regions are identified and classified, recognition engine 50 can then segregate the text according to the boundaries of those tessellated regions classified as containing text. Alternatively, recognition engine 52 may extract text for selected tessellated regions after those regions are identified and classified as containing text ignoring the remainder of the digital image.

In an alternative embodiment, classification engine 50, before classifying a region as containing text as described in the above process, may instruct recognition engine 52 to extract text for each tessellated region whose DTC value equals zero or is within a threshold of equaling zero. In other words classification engine 50 may instruct recognition engine 52 to obtain text for each tessellated region predicted to contain text. Classification engine 50 then identifies, for each tessellated region predicted to contain text, a percentage of the words in that region that can be identified in an electronic dictionary (not shown). If that percentage exceeds a threshold percentage, then classification engine 50 classifies that tessellated region as containing text.

Link engine 54 represents program instructions for linking tessellated regions based on a shared word or phrase. As mentioned above, linked tessellated regions may span across two or more digital images. In other words, each of a pair of linked tessellated regions may be defined on a different digital image. In such cases link engine 54 identifies words and/or phrases shared by tessellated regions classified as containing text that have been identified on separate but related digital images.

In performing its tasks, link engine 54 may identify a weighted set of words or phrases in each tessellated region classified as containing text, recognizing tessellated regions that share a weighted word or phrase; and then establishing links between the recognized tessellated regions. Link engine 54 may identify a weighted word set by computing, for each tessellated region, the relative occurrences of words or phrases as compared to a larger corpus. An example of such a corpus is a statistical database generated from the British National Corpus (BNC), a 100 million word electronic databank sampled from the whole range of present-day English, spoken & written. Link engine 54 may also or instead identify a weighted word set by computing the relative occurrence of lemmatized words or phrases in each tessellated region as compared to that larger corpus. A lemmatized word is one in which a suffixes and prefixes are ignored focusing on the stem of the word. For example the lemmatized form of "reengineered" could be "engineer."

Flow engine 56 represents program instructions for defining a logical text flow between linked tessellated regions. For example, if the tessellated regions are oriented in columns, as will be seen in FIG. 13, that flow may travel from top to bottom and left to right starting at the upper-most tessellated region of the left-most column in the digital image.

Assembly engine 57 represents program instructions for assembling a digital document from a set of digital images. Related digital images may be a set of scanned pages of a physical document. An assembled digital document includes a page corresponding to each digital image, the text extracted for each tessellated region classified as containing text, and a page layout defining the placement of the text with respect to each page of the digital document, and date representative of the logical text flow between linked tessellated regions. It is noted that a digital document as described here includes text apart from the set of digital images. In this manner the digital document can be searched and indexed. It is also noted that a digital document may also include individual graphic files each representative of an individual photo image of vector drawing found in a given digital image. In this case, the page layout would also describe the placement of each individual graphic file with respect to each page of the digital document.

In other words, an assembled digital document includes content elements, defines a text flow, and describes a page layout for the content elements. The content elements include the text for each tessellated region classified as containing text, any vector drawings, and any photo. The page layout defines the placement of each of these content elements for each page of the digital document. The text flow describes a flow of the text between tessellated regions.

Figure 9:
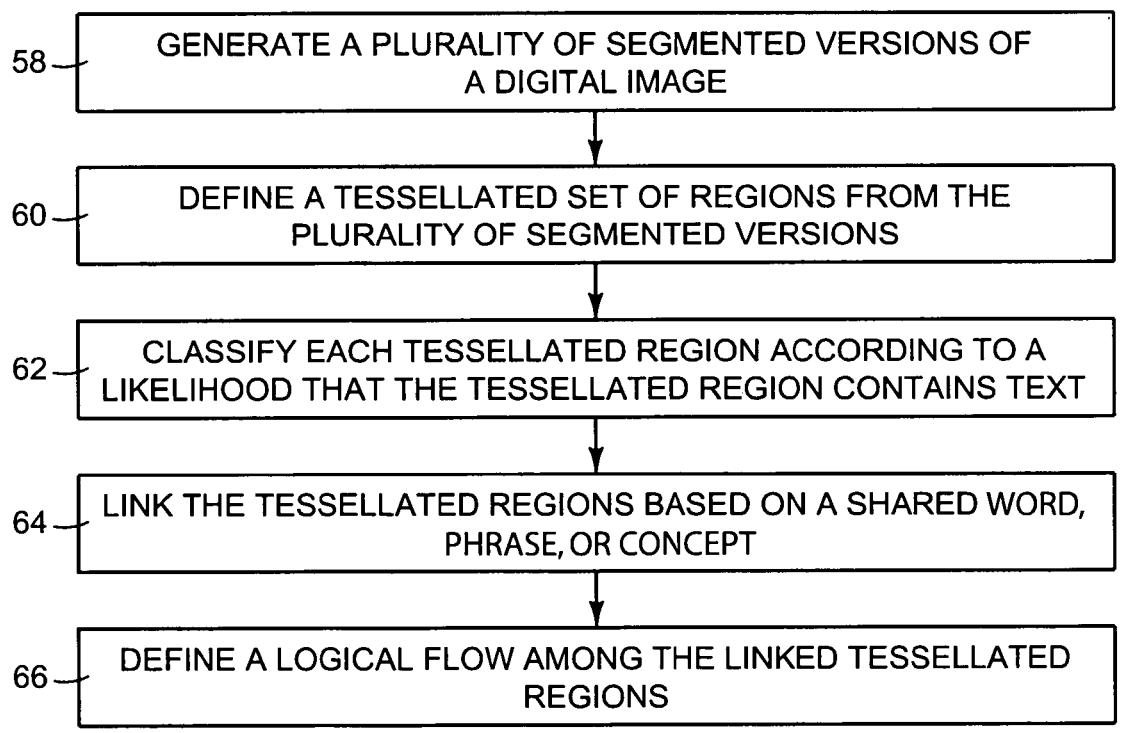
FIGS. 9-11 are exemplary flow diagrams illustrating steps for implementing various embodiments.
Figure 10:
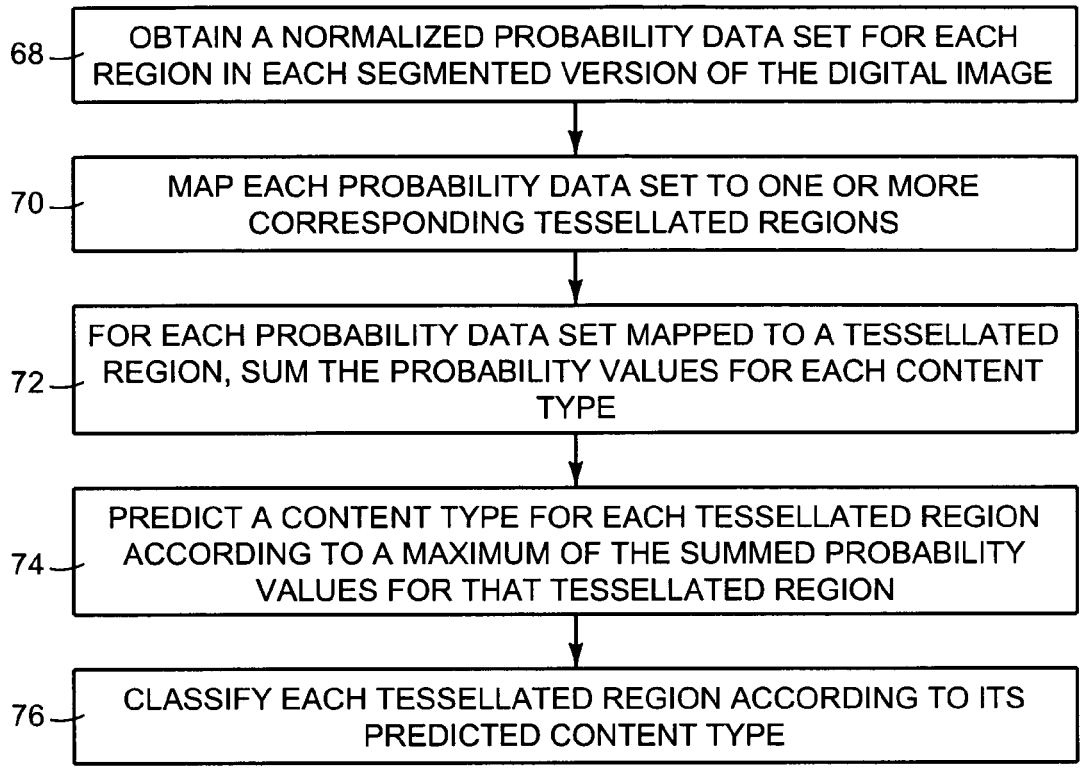
Figure 11:
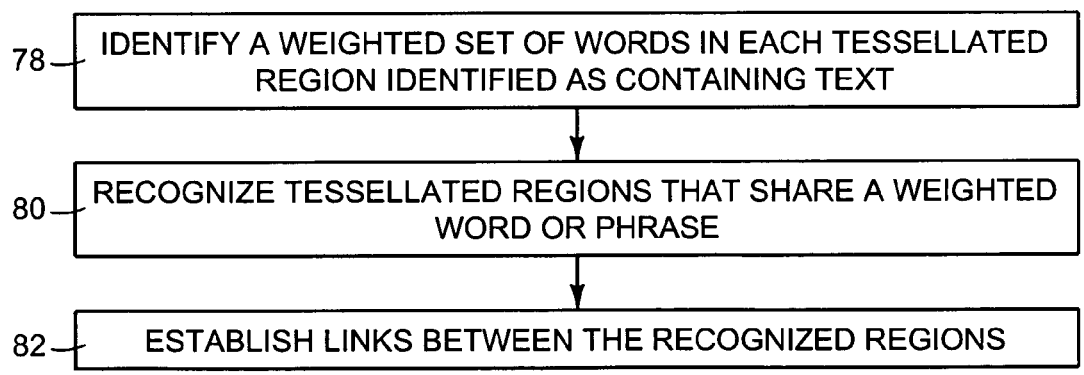

OPERATION: FIGS. 9-11 illustrate the operation of various embodiments. Starting with FIG. 9, a plurality of segmented versions of a digital image are generated (step 58). The digital image, for example, may be a scan of a physical page and may be one of a set of related digital images each corresponding to a different page of a particular document. Referring back to FIG. 8, each zoning engine 46 generates a segmented version of a digital image when that zoning engine 46 defines regions within that digital image.

Next, a tessellated set of regions is defined from the plurality of segmented versions (step 60). Each tessellated region is classified according to a likelihood that the tessellated region contains text (step 62). A more detailed example of how step 62 may be implemented is described below with reference to FIG. 10. Steps 58-60 may be repeated for each digital image in a related set of digital image before proceeding. Further, it is noted that zoning engines 46, tessellation engine 48, and classification engine 50 (FIG. 8) may be utilized to implement steps 58, 60, and 62 respectively.

The tessellated regions are linked based on shared words and/or phrases (step 64). Again these links may span two or more digital images. A logical text flow is then defined for the text bounded by the linked tessellated regions (step 66). A digital document can then be assembled from the digital images and the information obtained through the performance of steps 58-66. It is noted that Step 64 may be performed by link engine 54 and that step 66 may be performed by flow engine 56 (FIG. 8). The assembled digital document will include a page corresponding to each digital image. Each page of the digital document includes its corresponding digital image. The digital document also includes the text obtained from each tessellated region classified as containing text. The digital document defines the logical text flow and a page layout that describes the placement of the text for each page of the digital document. The logical text flow describes a flow of the text between linked tessellated regions.

FIG. 10 illustrates a more detailed example of how step 62 of FIG. 9 may be implemented, that is, FIG. 10 illustrates in more detail steps that may be taken to classify a tessellated region. A normalized probability data set is obtained for each non-tessellated region in each segmented version of a digital image generated in step 58 in FIG. 9 (step 68). Each probability data set is mapped to one or more corresponding tessellated regions (step 70).

For each probability data set mapped to a tessellated region, the probability values for each content type are summed (step 72). As described above, a probability data set contains a probability value for each of a group of possible content types that a region may contain. For example, text vector drawing, and photo image are three possible content types. Two or more probability data sets may be mapped to a particular tessellated region. Step 72, then involves summing the probability values for text, summing the probability values for vector drawing, and summing the probability values for photo image.

A content type for each tessellated region is predicted according to a maximum of the summed probability values for that tessellated region. Continuing with the above example, where the summed probability values for text exceeds the other, the particular tessellated region is predicted to include text (step 74). Each tessellated region is classified at least in part according to its predicted content type (step 76).

As discussed and alluded to above, a tessellated region predicted in step 74 to contain text will be classified as "Always Text." A tessellated region not predicted to contain text may still be classified as "Conditional Text" if a differential text classification (DTC) value for that tessellated region is within a predetermined threshold of equaling zero. The DTC value for a given tessellated region is calculated by subtracting the maximum of the summed probability values (for typing the region as "text", "image", etc.) from the summed probability values for the text content type. When a region is predicted to contain text, the DTC value should be zero. However, in other cases it may be only slightly more likely that a tessellated region contains a content type other than text. In such case, an examination of the DTC value allows such tessellated region to be classified as containing text. A DTC value that is less than zero but within a certain predetermined tolerance of zero can indicate that a given tessellated region contains text. For example a particular tessellated region may predominantly include a photo image but also contain a text caption. It may then be determined that the region is slightly more likely to contain a photo image than text. If the tolerance value is properly chosen, the DTC value for that tessellated region will be less than zero but within that tolerance allowing that tessellated to be classified as containing text even though it may predominantly contain a photo image or other content type.

After determining a DTC value and predicting a content type for a tessellated region but before classifying that region, text may be obtained for each tessellated region predicted to contain text. It is then identified, for each tessellated region predicted to contain text, a percentage of the words in that region that can be identified in an electronic dictionary. If that percentage exceeds a threshold percentage, then that tessellated region is classified as containing text in step 62.

FIG. 11 illustrates a more detailed example of how step 64 of FIG. 9 may be implemented, that is, FIG. 11 illustrates in more detail steps that may be taken to link tessellated regions. A weighted set of words is identified in each tessellated region identified as containing text (step 78). This, for example, can be accomplished by comparing the relative occurrence of lemmatized words or phrases within a tessellated region as compare to an occurrence of the same word or phrase in a larger corpus. Tessellated regions that share a weighted word or phrase are recognized (step 80). Links are established between the recognized tessellated regions (step 82).

IMPLEMENTATION EXAMPLES: FIGS. 12 and 13 help illustrate an exemplary implementation of the methods of FIGS. 9-11. FIG. 12 starts with a digital image 84. Zoning engines 86-90 each generate a segmented version 92-96 of that digital image 84. In this example, each segmented version 92-96 includes regions different than the regions of the other segmented versions. A tessellated set 98 of regions ($T_1$-$T_6$) is defined from the regions identified by the segmented versions 92-96 of digital image 84. Note that the tessellated set does not match the set provided by any single zoning engine.

Probability values in probability data sets obtained for or from each zoning engine 86-90 each predict a content type for a particular tessellated region with respect to a given zoning engine 86-90. For example, probability values of data sets ($D_{x1}$-$D_{x6}$) predict the content type for each tessellated region ($T_1$-$T_6$) with respect to zoning engine 86. Probability values of data sets ($D_{Y1}$-$D_{Y6}$) predict the content type for each tessellated region ($T_1$-$T_6$) with respect to zoning engine 88. Probability values of data sets ($D_{Z1}$-$D_{Z6}$) predict the content type for each tessellated region ($T_1$-$T_6$) with respect to zoning engine 90.

The maximum summed value of probability values for corresponding content types for each tessellated region ($T_1$-$T_6$) is identified and used to classify those regions. Here, classifications ($C_{T1}$-$C_{T6}$) can then be used to control whether text for a particular tessellated region will be extracted. As discussed above, possible classifications include "Always Text", "Conditional Text", and "Never Text". Tessellated regions ($T_1$-$T_6$) classified as "Always Text" or "Conditional Text" are thus classified as containing text. Tessellated regions ($T_1$-$T_6$) classified as "Never Text" are not.

Moving to FIG. 13, in block 108 a digital image is shown to include six tessellated regions each of which has been classified $C_A$, $C_C$, or $C_N$. $C_A$ represents "Always Text, $C_C$ represents "Conditional Text," and $C_N$ represents "Never Text." In block 110 links are defined between tessellated regions classified as containing text.

Block 112 shows how tessellated regions can be grouped into articles based on links. Tessellated region one is not linked to any other tessellated region, so the text in that tessellated region it is defined as article (a). Tessellated regions two, three, four, and six are all linked, and the text in those tessellated regions is defined as article (b). Text flows within a given article. Since article (a) includes only one tessellated region, the text flow for that article is limited to that tessellated region. Article (b) includes four tessellated regions, so the text flow for that article flows from tessellated region two to tessellated region three to tessellated region four and on to tessellated region six. While not shown, links and articles may span across two or more digital images. As a consequence, tessellated region one could be linked to one or more tessellated regions identified in one or more additional digital images. As a result article (a) would define a text flow that spans across those digital images.

CONCLUSION: The network environment 11 of FIG. 5 illustrates an exemplary environment in which embodiments may be implemented. Implementation, however, is not limited to environment 11. The block diagrams of FIGS. 2-4 show the architecture, functionality, and operation of various embodiments of the present invention. A number of the blocks are defined at least in part as programs. Each of those blocks may represent in whole or in part a module, segment, or portion of code that comprises one or more executable instructions to implement the specified logical function(s). Each block may also represent a circuit or a number of interconnected circuits to implement the specified logical function(s).

Also, the present invention can be embodied at least in part, in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes, hard drives or a portable compact disc.

Although the flow diagrams of FIGS. 9-11 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for classifying regions defined within a digital image, comprising:
   using a tessellation engine for defining a tessellated set of regions from a plurality of regions identified by a plurality of segmented versions of the digital image;
   using a classification engine for classifying each tessellated region according to a likelihood that the tessellated region contains text;
   using a recognition engine for defining a logical text flow among at least some of the tessellated regions; and
   using an assembly engine for automatically assembling a digital document from the digital image, the digital document including text from the tessellated regions classified as containing text, a page layout defining the placement of the text, and data representative of the logical text flow.

2. The method of claim 1, wherein classifying comprises:
   obtaining a normalized probability data set for each region identified in each segmented version of the digital image, each set of probability data containing a probability value for each of a plurality of content types;
   mapping each probability data set to one or more corresponding tessellated regions;
   for each probability data set mapped to a particular tessellated region, summing the probability values for each content type; and
   predicting a content type for each tessellated region based at least in part upon a maximum of the summed probability values for that tessellated region; and
   classifying each tessellated region at least partially according to its predicted content type.

3. The method of claim 2, further comprising weighting each probability value according to a confidence factor for a zoning engine for which the probability value was obtained and wherein summing comprises summing the weighted probability values.

4. The method of claim 2, further comprising obtaining text for each tessellated region predicted to contain text and wherein classifying comprises classifying each tessellated region predicted to contain text at least partially according to a percentage of text from that tessellated region that is found in an electronic dictionary.

5. The method of claim 1, further comprising linking tessellated regions classified as containing text based on a shared word or phrase.

6. The method of claim 5, wherein linking comprises
   identifying a weighted set of words or phrases in each tessellated region classified as containing text;
   recognizing tessellated regions that share a weighted word or phrase; and
   establishing links between the recognized tessellated regions.

7. The method of claim 6, wherein identifying a weighted word set comprises, for each tessellated region, computing relative occurrences of words or phrases as compared to a larger corpus.

8. The method of claim 5, wherein defining a logical text flow comprises defining a logical text flow among at least some of the linked tessellated regions.

9. The method of claim 8, further comprising repeating the acts of defining a tessellated set of regions, classifying each tessellated region for each of plurality of digital images, and wherein:
   linking tessellated regions comprises linking tessellated regions classified as containing text based on a shared word or phrase where one or more linked pair of tessellated regions are defined on two different digital images from among the plurality of digital images; and
   wherein defining a logical text flow comprises defining a logical text flow among at least some of the linked tessellated regions where the logical text flow spans between two or more of the plurality of digital images.

10. The method of claim 9, wherein automatically assembling comprises automatically assembling a digital document from the plurality of digital images, the digital document including text from the tessellated regions classified as containing text, a page layout defines the placement of the text, and data representative of the logical text flow.

11. A computer readable medium having computer executable instructions for:
   using a tessellation engine for defining a tessellated set of regions from a plurality of regions identified by a plurality of segmented versions of the digital image;
   using a classification engine for classifying each tessellated region according to a likelihood that the tessellated region contains text;
   using a recognition engine for defining a logical text flow among at least some of the tessellated regions; and
   using an assembly engine for automatically assembling a digital document from the digital image, the digital document including text from the tessellated regions classified as containing text, a page layout defining the placement of the text, and data representative of the logical text flow.

12. The medium of claim 11, wherein the instructions for classifying include instructions for:
   obtaining a normalized probability data set for each region identified in each segmented version of the digital image, each set of probability data containing a probability value for each of a plurality of content types;
   mapping each probability data set to one or more corresponding tessellated regions;
   for each probability data set mapped to a particular tessellated region, summing the probability values for each content type; and
   predicting a content type for each tessellated region based at least in part upon a maximum of the summed probability values for that tessellated region; and
   classifying each tessellated region at least partially according to its predicted content type.

13. The medium of claim 12, having further instructions for weighting each probability value according to a confidence factor for a zoning engine for which the probability value was obtained and wherein the instructions for summing include instructions for summing the weighted probability values.

14. The medium of claim 12, having further instructions for obtaining text for each tessellated region predicted to contain text and wherein the instructions for classifying include instructions for classifying each tessellated region predicted to contain text at least partially according to a percentage of text from that tessellated region that is found in an electronic dictionary.

15. The medium of claim 11, having further instructions for linking tessellated regions based on a shared word or phrase.

16. The medium of claim 15, wherein the instructions for linking include instructions for
   Identify a weighted set of words or phrases in each tessellated region classified as containing text;
   recognizing tessellated regions that share a weighted word or phrase; and
   establishing links between the recognized tessellated regions.

17. The medium of claim 16, wherein the instructions for identifying a weighted word set include instructions for, for each tessellated region, computing relative occurrences of words or phrases as compared to a larger corpus.

18. The medium of claim 15, wherein the instructions for defining a logical text flow include instructions for defining a logical text flow among at least some of the linked tessellated regions.

19. The medium of claim 18, having further instructions for executing the instructions for defining a tessellated set of regions, classifying each tessellated region for each of plurality of digital images, and wherein:
   The instructions for linking tessellated regions include instructions for linking tessellated regions classified as containing text based on a shared word or phrase where one or more linked pair of tessellated regions are defined on two different digital images from among the plurality of digital images; and
   wherein the instructions for defining a logical text flow include instructions for defining a logical text flow among at least some of the linked tessellated regions where the logical text flow spans between two or more of the plurality of digital images.

20. The medium of claim 19, wherein the instructions for automatically assembling include instructions for automatically assembling a digital document from the plurality of digital images, the digital document including text from the tessellated regions classified as containing text, a page layout that defines the placement of the text, data representative of the logical text flow.

21. A system for classifying regions defined within a digital image, comprising:
   a tessellation engine operable to define a tessellated set of regions from a plurality of regions identified by a plurality of segmented versions of the digital image; and
   a classification engine operable to classify each tessellated region according to a likelihood that the tessellated region contains text.

22. The system of claim 21, wherein the classification engine is operable to:
   obtain a normalized probability data set for each region identified in each segmented version of the digital image, each set of probability data containing a probability value for each of a plurality of content types;
   map each probability data set to one or more corresponding tessellated regions;
   for each probability data set mapped to a particular tessellated region, sum the probability values for each content type; and
   predict a content type for each tessellated region based at least in part upon a maximum of the summed probability values for that tessellated region; and
   classify each tessellated region at least partially according to its predicted content type.

23. The system of claim 22, wherein the classification engine is further operable to weight each probability value according to a confidence factor for a zoning engine for which the probability value was obtained and to sum the weighted probability values.

24. The system of claim 22, further comprising a recognition engine operable to obtain text for each tessellated region predicted to contain text and wherein the classification engine is operable to classify each tessellated region predicted to contain text at least partially according to a percentage of text from that tessellated region that is found in an electronic dictionary.

25. The system of claim 21, further comprising a link engine operable to link tessellated regions based on a shared word or phrase.

26. The system of claim 25, wherein the linking engine is operable to:
   identify a weighted set of words or phrases in each tessellated region classified as containing text;
   recognize tessellated regions that share a weighted word or phrase; and
   establish links between the recognized tessellated regions.

27. The system of claim 26, wherein the linking engine is operable to identify a weighted word set for each tessellated region, by computing relative occurrences of words or phrases within that tessellated region as compared to a larger corpus.

28. The system of claim 25, further comprising a flow engine operable to define a logical text flow among at least some of the linked tessellated regions.

29. The system of claim 28, wherein the tessellation engine, classification engine are operable to perform their respective functions for each of plurality of digital images, and wherein:

The linking engine is operable to link tessellated regions classified as containing text based on a shared word or phrase where one or more linked pair of tessellated regions are defined on two different digital images from among the plurality of digital images; and wherein the flow engine is operable to define a logical text flow among at least some of the linked tessellated regions where the logical text flow spans between two or more of the plurality of digital images.

30. The system of claim 29, further comprising an assembly engine operable to assemble a digital document from the plurality of digital images, the digital document including text from the tessellated regions classified as containing text, a page layout that defines the placement of the text, and data representative of the logical text flow.

* * * * *

UNITED STATES PATENT AND TRADEMARK OFFICE
CERTIFICATE OF CORRECTION

PATENT NO. : 7,539,343 B2
APPLICATION NO. : 11/226661
DATED : May 26, 2009
INVENTOR(S) : Steven J. Simske et al.

It is certified that error appears in the above-identified patent and that said Letters Patent is hereby corrected as shown below:

In column 7, lines 52-53, delete "tessellated regions, one more than the two" and insert -- following tessellated pixel map. --, therefor.

In column 7, line 64, after "there are" insert -- now --.

Signed and Sealed this

Fifteenth Day of September, 2009

David J. Kappos
*Director of the United States Patent and Trademark Office*